(12) United States Patent  (10) Patent No.: US 9,395,895 B2
Cao et al.  (45) Date of Patent: Jul. 19, 2016

(54) DISPLAY METHOD AND APPARATUS, AND ELECTRONIC DEVICE

(71) Applicant: Lenovo (Beijing) Co., Ltd., Beijing (CN)

(72) Inventors: Lu Cao, Beijing (CN); Xiaoping Zhang, Beijing (CN); Yaqiang Wu, Beijing (CN); Zhepeng Wang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 194 days.

(21) Appl. No.: 14/220,387

(22) Filed: Mar. 20, 2014

(65) Prior Publication Data

US 2014/0292815 A1 Oct. 2, 2014

(30) Foreign Application Priority Data

Mar. 29, 2013 (CN) .......................... 2013 1 0109817

(51) Int. Cl.
*G06F 3/0484* (2013.01)
*G06T 3/00* (2006.01)
(52) U.S. Cl.
CPC .......... *G06F 3/04845* (2013.01); *G06T 3/0012* (2013.01)
(58) Field of Classification Search
None
See application file for complete search history.

(56) References Cited

U.S. PATENT DOCUMENTS

| 2003/0210258 | A1* | 11/2003 | Williams | G06F 3/011 715/700 |
| 2009/0079765 | A1* | 3/2009 | Hoover | G06F 3/0481 345/660 |
| 2014/0229873 | A1* | 8/2014 | Tremblay | G06F 3/017 715/771 |

* cited by examiner

*Primary Examiner* — Maurice L McDowell, Jr.
(74) *Attorney, Agent, or Firm* — Harness, Dickey & Pierce, P.L.C.

(57) ABSTRACT

A display method and apparatus and an electronic device are provided, in which a second image is displayed in accordance with a relative relationship between a user and a displaying supporter, i.e., the distance between a first operation object and a second operation object in a first image is different from that in a second image, in the case that the relative relationship satisfies a first preset condition. Therefore, when the distance between the operation objects is too small, the distance between the operation objects is enlarged and then the operation objects are displayed in the second image. When the distance between the operation objects is too large, the distance between the operation objects is reduced and then the operation objects are displayed in the second image. Therefore, the distance between the operation objects changes with the relative relationship between the user and the displaying supporter.

20 Claims, 7 Drawing Sheets

DISPLAY METHOD AND APPARATUS, AND ELECTRONIC DEVICE

This application claims the priority to Chinese Patent Application No. 201310109817.8, entitled "DISPLAY METHOD AND APPARATUS, AND ELECTRONIC DEVICE", filed with the Chinese Patent Office on Mar. 29, 2013, which is incorporated by reference in its entirety herein.

FIELD

The disclosure relates to the field of information processing, and particularly to a display method and apparatus and an electronic device.

BACKGROUND

Usually, a projection device may be used to project an image to be displayed onto a display supporter. With the development of technology, the user can interact with the image displayed on the projection supporter, i.e., the projection supporter may be touched to implement an operation. For example, the user clicks a button displayed on the projection supporter and an interface image linked to the button may be displayed.

When the displayed image includes a number of operation objects, operation objects may be different to be operated by the user due to too concentrated or too scattered arrangement of the operation objects. For example, when the projection supporter has a large area and the displayed image includes multiple scattered operation objects (e.g., multiple buttons), users often need to move back and forth to operate different operation objects. For another example, when multiple buttons gathers together in the displayed image, the user may falsely click a second button when clicks a first button. Therefore, the existing projection image displaying method is inconvenient for user's operation.

SUMMARY

In view of this, embodiments of the disclosure provide a display method, a display apparatus and an electronic device, to solve the problem that the existing projection image displaying method is inconvenient for users to operate.

Embodiments of the disclosure provide the following technical solution.

A display method applied to an electronic device is provided, wherein the electronic device present a first image on a display supporter, the first image includes at least a first operation object and a second operation object, and a first distance is provided between a first initial display position of the first operation object and a second initial display position of the second operation object, and wherein the operation object is triggered to display an image corresponding to the operation object, the display method includes:

acquiring a relative relationship between a user and the display supporter;

judging whether the relative relationship satisfies a first preset condition; and displaying a second image in the case that the relative relationship satisfies the first preset condition, wherein the second image includes the first operation object and the second operation object, a second distance is provided between a first object display position of the first operation object and a second object display position of the second operation object, and the second distance is different from the first distance.

Preferably, before the displaying a second image, the display method further includes:

determining a first position adjustment parameter; and determining a second image in accordance with the first image and the first position adjustment parameter;

wherein the first position adjustment parameter includes:

a first object position adjustment parameter corresponding to the first operation object and/or a second object position adjustment parameter corresponding to the second operation object.

Preferably, the display method further includes:

in the case that the first operation object has a first display area in the first image, determining that the first operation object has a third display area in the second image, wherein the third display area is different from the first display area; and in the case that the second operation object has a second display area in the first image, determining that the second operation object has a fourth display area in the second image, wherein the fourth display area is different from the second display area;

wherein the first display area has a first relationship with the third display area, the second display area has a second relationship with the fourth display area, and the first relationship is the same as the second relationship.

Preferably, before the displaying a second image, the display method further includes: in the case that the first image has a first display area, determining that the second image has a second display area, wherein the second display area is different from the first display area.

Preferably, in the case where the second distance is smaller than the first distance, before the displaying a second image, the display method further includes:

determining an operating range of the user on the display supporter;

determining a second position adjustment parameter in accordance with the operating range; and determining the second image in accordance with the second position adjustment parameter, wherein the first operation object and the second operation object are located in the operating range in the case that the second image is displayed with the second position adjustment parameter.

Preferably, the electronic device includes a projection unit and an image acquisition unit, and wherein when the display supporter is located in a projection region of the projection unit, the projection unit projects the first image on the display supporter, and the acquiring a relative relationship between a user and the display supporter includes:

acquiring an image captured by the image acquisition unit, wherein the user is presented in the image; and determining the relative relationship between the user and the display supporter in accordance with the image.

Preferably, the electronic device includes a display unit and an image acquisition unit, and wherein the acquiring a relative relationship between a user and the display supporter includes:

acquiring an image captured by the image acquisition unit, wherein the user is presented in the image; and determining the relative relationship between the user and the display supporter in accordance with the image.

Preferably, the first preset condition includes at least one of:

a first relationship between a distance from the user to the electronic device and a preset distance threshold; and a second relationship between an orientation of the user and a preset orientation.

Preferably, the electronic device includes a projection unit and an image acquisition unit, and wherein in the case that the display supporter is located in a projection region of the projection unit, the projection unit projects the first image on the display supporter, and the distance threshold is determined by:
- detecting a distance between the electronic device and the display supporter; and
- determining the distance threshold in accordance with the distance between the electronic device and the display supporter.

Preferably, after the displaying a second image, the display method further includes:
- judging whether the relative relationship satisfies a second preset condition; and
- outputting a third image in the case that the relative relationship satisfies the second preset condition, wherein the third image includes the first operation object and the second operation object, and the first distance is provided between a first updated display position of the first operation object and a second updated display position of the second operation object.

Preferably, the display method further includes:
- receiving an operation gesture of the user to an operation object; and
- displaying an image corresponding to the operation object in accordance with the operation gesture.

A display apparatus applied to an electronic device, wherein the electronic device present a first image on a display supporter, the first image includes at least a first operation object and a second operation object, a first distance is provided between a first initial display position of the first operation object and a second initial display position of the second operation object, and wherein the operation object is triggered to display an image corresponding to the operation object, and the display apparatus includes:
- an acquisition module configured to acquire a relative relationship between a user and the display supporter;
- a judgment module configured to judge whether the relative relationship satisfies a first preset condition; and
- a first display module configured to display a second image in the case that the relative relationship satisfies the first preset condition, wherein the second image includes the first operation object and the second operation object, and a second distance is provided between a first object display position of the first operation object and a second object display position of the second operation object, and the second distance is different from the first distance.

Preferably, the display apparatus further includes:
a first position parameter determination module configured to determine a first position adjustment parameter before the second image is displayed, and determine the second image in accordance with the first image and the first position adjustment parameter;
wherein the first position adjustment parameter includes:
a first object position adjustment parameter corresponding to the first operation object and/or a second object position adjustment parameter corresponding to the second operation object.

The display apparatus further includes:
a first scaling module configured to:
in the case that the first operation object has a first display area in the first image, determine that the first operation object has a third display area in the second image, and the third display area is different from the first display area;
in the case that the second operation object has a second display area in the first image, determine that the second operation object has a fourth display area in the second image, the fourth display area is different from the second display area;
wherein the first display area had a first relationship with the third display area, the second display area has a second relationship with the fourth display area, the first relationship is the same as the second relationship.

Preferably, the display apparatus further includes:
a second scaling module configured to, before the second image is displayed, determine that the second image has a second display area in the case that the first image has a first display area, wherein the second display area is different from the first display area.

Preferably, the display apparatus further includes:
a second position determination module configured to, in the case where the second distance is smaller than the first distance, determine an operating range of the user on the display supporter before the second image is displayed; determine a second position adjustment parameter in accordance with the operating range; and determine the second image in accordance with the second position adjustment parameter, wherein the first operation object and the second operation object are located in the operating range in the case that the second image is displayed according to the second position adjustment parameter.

Preferably, the electronic device includes a projection unit and an image acquisition unit, and when the display supporter is located in a projection region of the projection unit, the projection unit projects the first image on the display supporter, and wherein the image acquisition module includes:
a first acquisition unit configured to acquire an image captured by the image acquisition unit, wherein the user is presented in the image; and
a first determination unit configured to determine the relative relationship between the user and the display supporter in accordance with the image.

Preferably, the electronic device includes a display unit and an image acquisition unit, and the acquisition module includes:
a second acquisition unit configured to acquire an image captured by the image acquisition unit, wherein the user is presented in the image; and
a second determination unit configured to determine the relative relationship between the user and the display unit in accordance with the image.

Preferably, the first preset condition includes at least one of:
a first relationship between a distance from the user to the electronic device and a preset distance threshold; and
a second relationship between an orientation of the user and a preset orientation.

Preferably, the electronic device includes a projection unit and an image acquisition unit, and in the case that the display supporter is located in a projection region of the projection unit, the projection unit projects the first image on the display supporter, and the display apparatus further includes:
a threshold determination module configured to detect a distance between the electronic device and the display supporter, and determine the distance threshold in accordance with the distance between the electronic device and the display supporter.

Preferably, the display apparatus further includes:
a second display module configured to, after the second image is displayed, judge whether the relative relationship satisfies a second preset condition, and output a third image in the case that the relative relationship satisfies the second preset condition, wherein the third image includes the first operation object and the second operation object, and the first distance is provided between a first updated display position of the first operation object and a second updated display position of the second operation object.

Preferably, the display apparatus further includes:
an operation control module configured to receive an operation gesture of the user to an operation object, and display an image corresponding to the operation object in accordance with the operation gesture.

An electronic device, including:
a projection unit and an image acquisition unit, wherein in the case that a display supporter is located in a projection region of the projection unit, the projection unit projects a first image on the display supporter, the first image includes at least a first operation object and a second operation object, a first distance is provided between a first initial display position of the first operation object and a second initial display position of the second operation object, and wherein the operation object is triggered to display an image corresponding to the operation object; and
a processor configured to acquire a relative relationship between a user and the display supporter, and judge whether the relative relationship satisfies a first preset condition; display a second image in the case that the relative relationship satisfies the first preset condition, wherein the second image includes the first operation object and the second operation object, a second distance is provided between a first object display position of the first operation object and a second object display position of the second operation object, and the second distance is different from the first distance.

In the display method and apparatus and the electronic device provided by the embodiments of the disclosure, the display image is displayed in accordance with the relative relationship between the user and the display supporter. That is, the distance between the first operation object and the second operation object displayed in the second image may be different from that in the first image when the relative relationship satisfies the first preset condition. Therefore, when the distance between operation objects is too small, the operation objects may be displayed in the second image after the distance between the operation objects is enlarged. When the distance between the operation objects is too large, the operation objects may be displayed in the second image after the distance between the operation objects is reduced. Therefore, the distance between the operation objects may be changed with the relative relationship between the user and the display supporter, and thus it is convenient for users to operate.

BRIEF DESCRIPTION OF THE DRAWINGS

In order to more clearly illustrate the technical solutions in embodiments of the disclosure, accompanying drawings referred to describe the embodiments are introduced simply hereinafter. Obviously, the accompanying drawings in the following description are just some embodiments recited in the disclosure. For those skilled in the art, other accompanying drawings can also be obtained based on these accompanying drawings provided herein without any creative work.

DETAILED DESCRIPTION OF THE EMBODIMENTS

In the following, the technical solutions in the embodiments of the disclosure will be described clearly and completely in conjunction with the accompanying drawings in the embodiments of the disclosure. Obviously, the described embodiments are just a part of embodiments of the disclosure, rather than all embodiments. Based on the embodiments of the disclosure, all other embodiments obtained by those skilled in the art without any creative work will fall within the scope of protection of the disclosure.

An embodiment of the disclosure discloses a display method applied to an electronic device. The electronic device may present a first image on a display supporter. The first image includes at least a first operation object and a second operation object. A first distance is provided between a first initial display position of the first operation object and a second initial display position of the second operation object. The operation object is triggered to display an image corresponding to the operation object.

Figure 1:
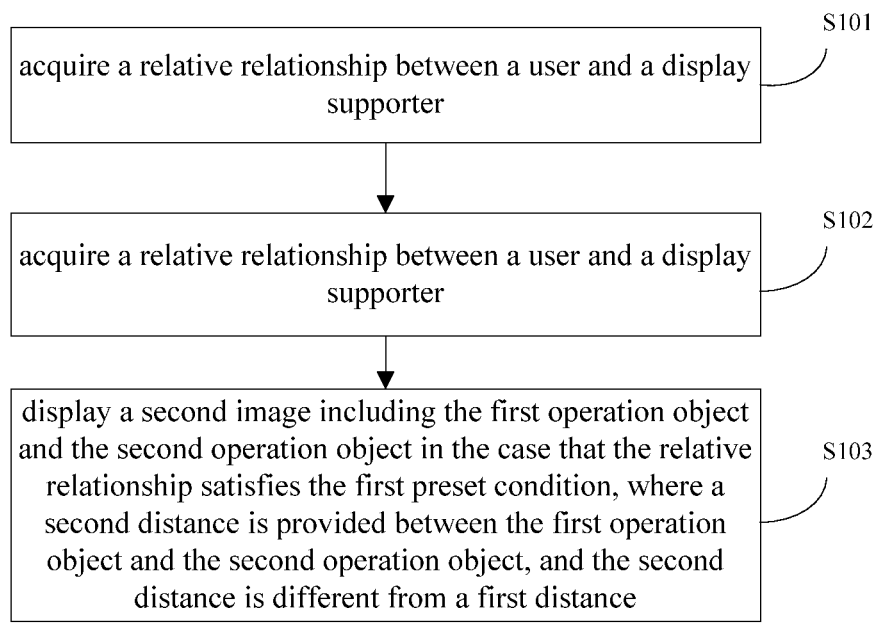
FIG. 1 is a flow chart of a display method according to an embodiment of the disclosure.

As shown in FIG. 1, the method according to the embodiment includes: steps S101-S103.

S101: acquiring a relative relationship between a user and the display supporter.

S102: judging whether the relative relationship satisfies a first preset condition.

S103: displaying a second image in the case that the relative relationship satisfies the first preset condition, where the second image includes the first operation object and the second operation object, a second distance is provided between a first object display position of the first operation object and a second object display position of the second operation object, and the second distance is different from the first distance.

With the display method described in the embodiment, the second image is displayed in accordance with the relative relationship between the user and the display supporter. In this way, the first operation object and the second operation object in the first image can be displayed in the second image after a relative distance therebetween is changed. Therefore, the distance between the operation objects may change with the relative relationship between the user and the display supporter. For example, the distance between the operation objects may be reduced, and the user does not need to walk when operating scattered operation objects. Alternatively, the distance between the operation objects may be enlarged, and a misoperation may be avoided when the user operates concentrated operation objects. Thereby, the display method described in the embodiment can facilitate the user to perform an operation on the operation objects.

An embodiment of the disclosure provides another display method, which is applied to a scenario as follows.

An electronic device may present a first image on a display supporter under a control of a remote control device. The first image includes at least a first operation object and a second operation object. A first distance is provided between a first initial display position of the first operation object and a second initial display position of the second operation object. The operation object is triggered to display an image corresponding to the operation object. In order to perform long-distance control on the operation objects easily by using a remote control device with a low precision, the display supporter has a large area, and the operation objects in the first image are in a scattered displaying state. In addition to the long-distance operation, a short-distance operation may be performed on the operation objects.

Figure 2:
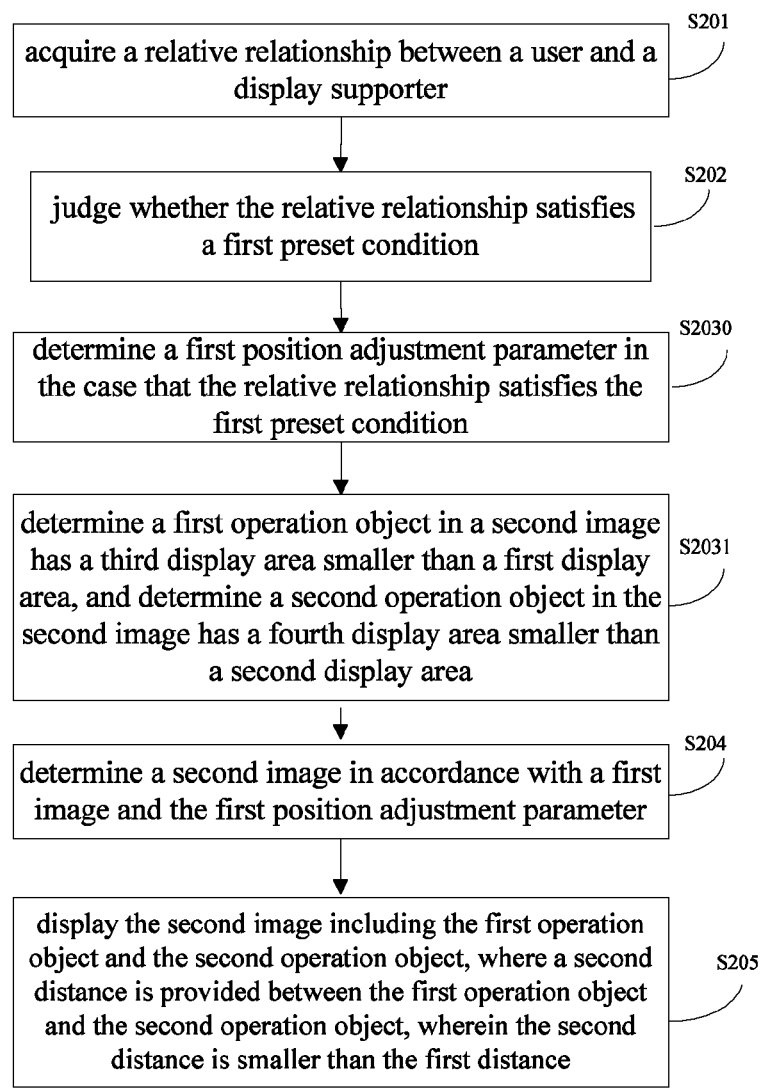
FIG. 2 is a flow chart of another display method according to an embodiment of the disclosure.

When a short-distance operation is performed on the operation objects, as shown in FIG. 2, the method in the embodiment includes steps S201-S205.

S201: acquiring a relative relationship between a user and the display supporter.

S202: judging whether the relative relationship satisfies a first preset condition.

S2030: determining a first position adjustment parameter in the case that the relative relationship satisfies the first preset condition.

Specifically, the first position adjustment parameter includes: a first object position adjustment parameter of the first operation object, a second object position adjustment parameter of the second operation object, or a first object position adjustment parameter of the first operation object and a second object position adjustment parameter of the second operation object.

That is, related with the first image, both the positions of the first operation object and the second operation object may be changed in the second image; or only the position of one operation object may be changed while the position of the other operation object is unchanged.

It should be noted that, the first (or second) object position adjustment parameter may be display position coordinates of the first (or second) operation object, such as the current display position coordinates of the first (or second) operation object (101, 211). Alternatively, the first (or second) object position adjustment parameter may also be a variation in the display position coordinates of the first (or second) object position, such as a variation (10, 20) in coordinates obtained by comparing with the display coordinates of the first (or second) operation object in the first image. In other words, the second object position adjustment parameter may be an absolute value parameter, or may also be a relative value parameter.

S204: determining a second image in accordance with the first image and the first position adjustment parameter.

When the first (or second) object position adjustment parameter is the display position coordinates of the first (or second) operation object, the display position of the first (or second) operation object in the second image may be determined in accordance with the display position coordinates. When the first (or second) object position adjustment parameter is the variation of the display position coordinates of the first (or second) object position, the display position of the first (or second) operation object in the second image may be determined in accordance with the first (or second) initial display position of the first (or second) operation object in the first image and the variation of the display position coordinates. For example, the initial display position of the first operation object in the first image is (91, 191), the variation of the display position coordinates of the first operation object is (10, 20), and then the display position coordinates of the first operation object in the second image are (101, 211).

S205: displaying the second image. The second image includes the first operation object and the second operation object. A second distance is provided between a first object display position of the first operation object and a second object display position of the second operation object. The second distance is smaller than the first distance.

Compared with the first image, the first operation object and the second operation object "gather together" in the second image according to the first position adjustment parameter determined in the step S2030. Thereby, the first operation object and the second operation object are displayed in a "gathered" displaying state, instead of a scattered displaying state.

Preferably, the method according to the embodiment may also include step S2031.

S2031: when the first operation object has a first display area in the first image, determining that the first operation object has a third display area in the second image, where the third display area is smaller than the first display area; and when the second operation object has a second display area in the first image, determining that the second operation object has a fourth display area in the second image, where the fourth display area is smaller than the second display area.

Thus, the display areas of the first operation object and the second operation object are decreased, the operation objects are not only "gathered" but also "become small". Furthermore, the decreased display area can facilitate the operation object to be "gathered".

Both step S2030 and S2031 are between step S202 and S205, the order of which is not defined.

Figure 3A:
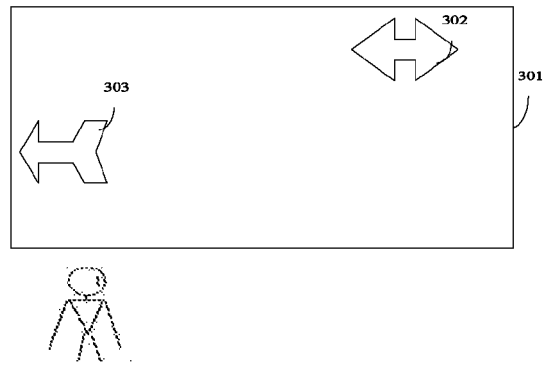
FIG. 3(a) and FIG. 3(b) are schematic diagrams showing a result obtained by a display method according to an embodiment of the disclosure.
Figure 3B:
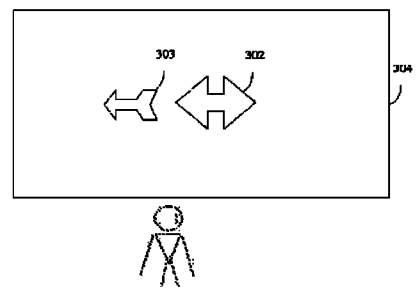

FIG. 3(*a*) shows a first image 301, which includes a first operation object 302 and a second operation object 303. The user needs to move a position thereof to operate the first operation object and then operate the second operation object. With the method according to the embodiment, a second image 304 is obtained. As shown in FIG. 3(*b*), the first operation object 302 and the second operation object 303 are "gathered" and "become small". Therefore, the user may operate on both operation objects at the same position.

In the steps described above, the scattered operation objects are "gathered" by determining parameters of the operation objects, rather than parameters of the image. Therefore, compared with the first image, except the position of the operation objects, other elements of the second image do not change, i.e., "background" of the second image (except the operation object) may be unchanged. In addition, in the embodiment, the following method may be used to achieve the "gathering":

The steps S2030 to S204 described above may be replaced with:

when the relative relationship satisfies the first preset condition and the first image has a first display area, determining that the second image has a second display area, where the second display area is different from the first display area.

Figure 4A:
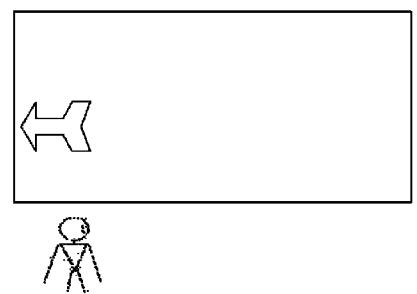
FIG. 4(a) and FIG. 4(b) are schematic diagrams showing a result obtained by another display method according to an embodiment of the disclosure.
Figure 4B:
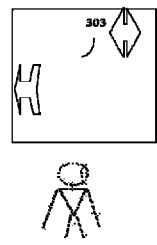

In this case, the operation objects are "gathered" by shrinking the whole image. As shown in FIG. 4, FIG. 4(a) shows a first image, and FIG. 4(b) shows a second image. The first image is shrunk overall to obtain the second image, and hence a distance between the first operation object and the second operation object is shortened.

According to the display method described in the embodiment, in the case where scattered operation objects are displayed on a large display supporter, the scattered operation objects are "gathered", thereby bringing convenience for the user to operate on different operation objects.

An embodiment of the disclosure also discloses a display method, which is applied to a scenario as follows.

An electronic device presents a first image on a display supporter. The first image includes at least a first operation object and a second operation object. A first distance is provided between a first initial display position of the first operation object and a second initial display position of the second operation object. An operation object is triggered to display an image corresponding to the operation object. In order to operate the operation object easily by using a remote control device with a low precision, the display supporter has a large area, and the operation objects in the first image are in a scattered displaying state.

Figure 5:
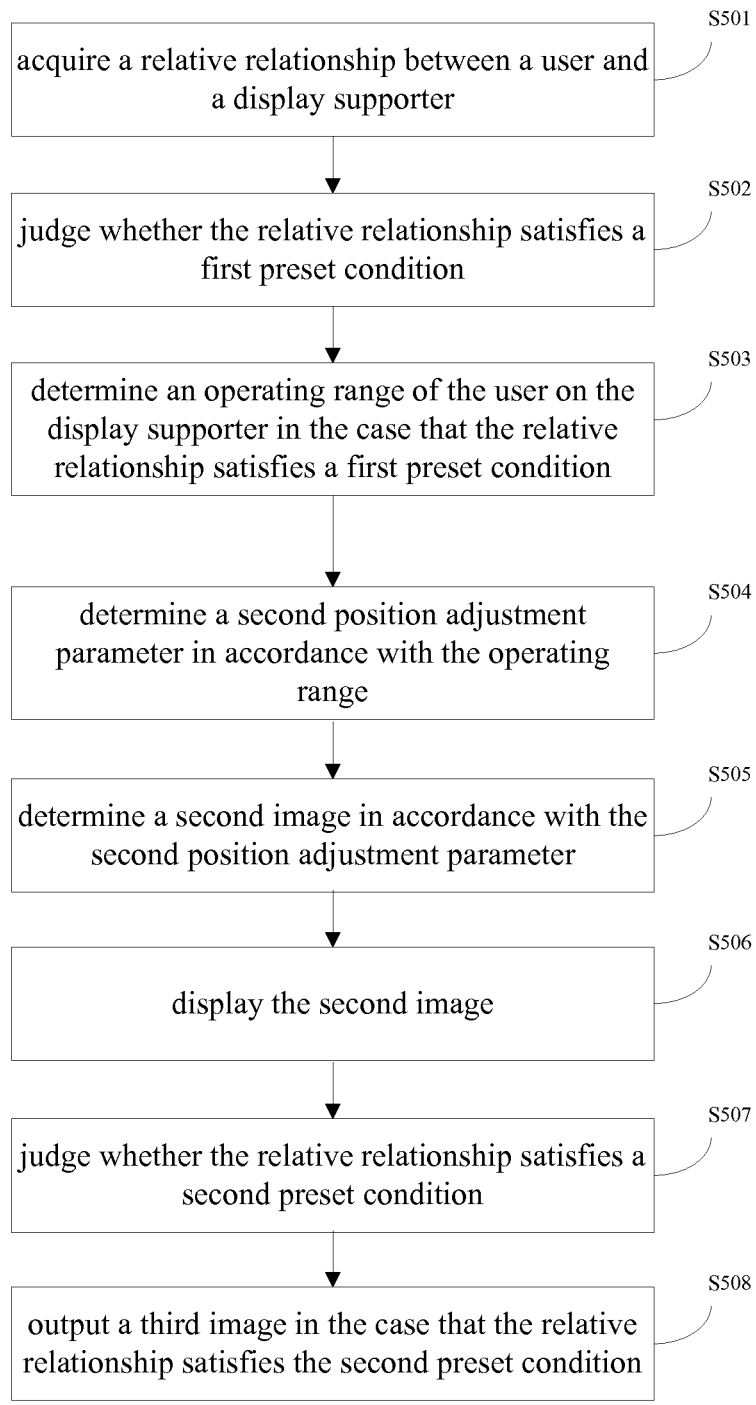
FIG. 5 is a flow chart of another display method according to an embodiment of the disclosure.

When a short-distance operation is performed on the operation objects, as shown in FIG. 5, the method includes steps S501-S506.

S501: acquiring a relative relationship between a user and the display supporter.

S502: judging whether the relative relationship satisfies a first preset condition.

S503: determining, on the display supporter, an operating range of the user when the relative relationship satisfies the first preset condition.

S504: determining a second position adjustment parameter in accordance with the operating range.

The second position adjustment parameter may be a parameter of the operation object, which may include: a position and/or an area of the operation object. It should be noted that, the second position adjustment parameter not only may consider that a distance between the first operation object and the second operation object is shortened, but also may consider that the display positions of the first operation object and the second operation object are located in the operating range.

S505: determining a second image in accordance with the second position adjustment parameter.

S506: displaying a second image. The second image includes the first operation object and the second operation object. A second distance is provided between a first object display position of the first operation object and a second object display position of the second operation object. The second distance is smaller than the first distance, and the first operation object and the second operation object are located in the operating range.

The method according to the embodiment differs from that according to the above embodiment in that, not only the first operation object and the second operation object are "gathered", but also the first operation object and the second operation object are "gathered" into the operating range of the user, thereby facilitating operations of the user.

It should be noted that, the above cases are only preferred methods according to the embodiment. In addition, the first operation object and the second operation object may be "gathered" into a predetermined range for displaying. When the operation object cannot be reached in the operation process, the user only needs to move to a certain position. Furthermore, since the operation objects are "gathered" to preset positions, the user may operate on different operation objects by moving only once. Thus, the problem that the user needs to move again due to not reaching another operation object is avoided.

Preferably, the method according to the embodiment may also include: steps S507-S508

S507: judging whether the relative relationship satisfies a second preset condition.

S508: outputting a third image when the relative relationship satisfies the second preset condition. The third image includes the first operation object and the second operation object. The first distance is provided between a first updated display position of the first operation object and a second updated display position of the second operation object.

In this case, after the operation objects are "gathered", when the relative relationship between the user and the display supporter satisfies the second preset condition, the operation objects are "restored", i.e., restored to the state before being "gathered".

The second preset condition may be opposite to the first preset condition. The first preset condition may be that the distance between the user and the display supporter is smaller than the first distance or the user faces the display supporter. The second preset condition may be that the distance between the user and the display supporter is larger than the first distance or the user backs onto the display supporter.

The first condition is a triggering condition for "gathering", and the second condition is a triggering condition for "restoring". That is, the "gathering" is triggered when the user is close to the display supporter, and the "restoring" is triggered when the user is away from the display supporter. Alternatively, the "gathering" is triggered when the user faces the display supporter, and the "restoring" is triggered when the user turns around and backs onto the display supporter.

According to the display method according to the embodiment, when the user needs to operate the operation objects, the operation objects may be "gathered" within the operating range of the user. After the user completes the operation, the operation object may be restored to the original state, hence facilitating operations of the user.

Another display method according to an embodiment of the disclosure is applied to an electronic device including a projection unit and an image acquisition unit. The image acquisition unit may be integrated with the projection unit. The image acquisition unit is adapted to acquire an image containing the user, and the image presents the operation of the user on the operation objects. An operation intention of the user to the operation objects is determined by analyzing the image, and thus the user may operate a short-distance gesture control on the projected display image.

In the embodiment, a display supporter may be a projection curtain or a wall. When the display supporter is located in the projection region of the projection unit, the projection unit may project a first image on the display supporter. The first image includes at least a first operation object and a second operation object. The first distance is provided between a first initial display position of the first operation object and a second initial display position of the second operation object.

The operation object is triggered to display an image corresponding to the operation object.

Figure 6:
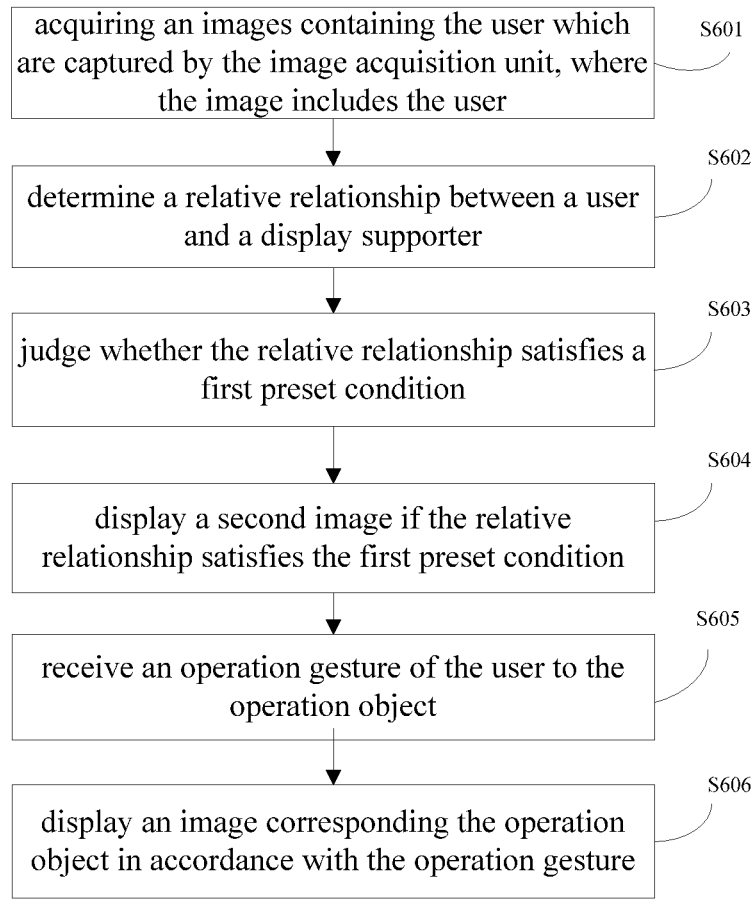
FIG. 6 is a flow chart of another display method according to an embodiment of the disclosure.

As shown is FIG. 6, the method according to the embodiment includes steps S601-S606.

S601: acquiring an image captured by the image acquisition unit, where the image includes the user.

S602: determining a relative relationship between the user and the display supporter in accordance with the image.

S603: judging whether the relative relationship satisfies a first preset condition.

In the embodiment, the first preset condition may include the following conditions that:

a first relationship between a distance from the user to the electronic device and a preset distance threshold;

a second relationship between an orientation of the user and a preset orientation; or a combination thereof. Specifically, the preset orientation may be an orientation that the user backs onto the electronic device.

In the electronic device according to the embodiment, the projection region and the image acquisition unit are located on different sides of the user. Therefore, it is considered that the relative relationship between the user and the electronic device satisfies the first preset condition, in the case that the distance from the user to the electronic device is greater than the preset distance threshold, or the user backs onto the electronic device, or the distance from the user to the electronic device is greater than the preset distance threshold and the user faces away from the electronic device.

S604: displaying a second images in the case that the relative relationship satisfies the first preset condition, where the second image includes the first operation object and the second operation object, and a second distance is provided between a first object display position of the first operation object and a second object display position of the second operation object, and the second distance is different from the first distance.

S605: receiving an operation gesture of the user to an operation object.

S606: displaying an image corresponding to the operation object in accordance with the operation gesture.

The method according to the embodiment is applied to a projection device. When the projection device projects on the projection region, the user may control a projection image by using the gesture. The image acquisition unit in the projection device judges the operation intention of the user by capturing images containing the user. Specifically, the user may trigger the operation object to display an image corresponding the operation object by an operation gesture for the operation object.

The method according to the embodiment may achieve the following effects.

In the case that the projection region has a large area and the operation objects are scattered on the projection region, when the user controls the operation objects by using a gesture in a short distance range, since the distance between operation objects is large, the user usually needs to move to operate on different operation objects. However, in the method according to the embodiment, when the user closes to the projection region from the projection device, the image acquisition unit acquires a distance between the user and the projection region, and the projection device may "gather" different operation objects together according to the distance between the user and the display supporter. Furthermore, different operation objects may be "gathered" within the operating range of the user. In this way, the user may operate on operation objects without movement. The specific "gathering" method may refer to the above embodiment. When the user backs onto the display supporter or moves away from the display supporter after the short-distance gesture control is finished, the operation objects are restored from the "gathering" state to a remote control state. Alternatively, when the image acquisition unit acquires that the user faces the display supporter, the projection device "gathers" the operation objects.

Similarly, in the case where the operation objects are gathered in the projection region, the method according to the embodiment may "scatter" the operation objects. In this way, another operation object will be not triggered falsely when the user operates on one operation object.

Figure 7:
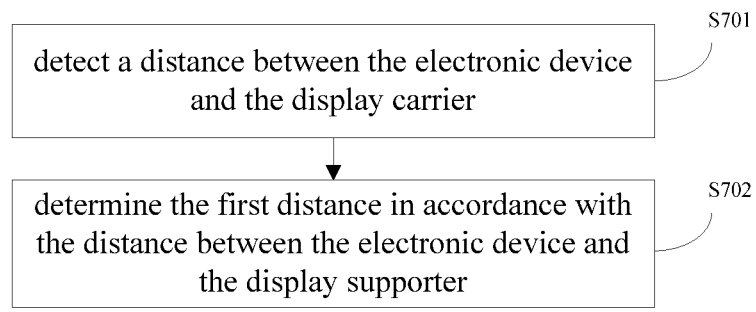
FIG. 7 is a flow chart of a method for determining a distance threshold in another display method according to an embodiment of the disclosure.

It should be noted that, in the embodiment, in the case where the electronic device is a projection device, a method for determining the distance threshold is shown in FIG. 7, which includes steps S701 and S702.

S701: detecting a distance between the electronic device and the display supporter.

S702: determining the distance threshold in accordance with the distance between the electronic device and the display supporter.

Specifically, the distance threshold may be a product of the distance and a first value, where the first value is a value less than 1, such as 0.8.

The distance threshold changes as the distance between the electronic device and the display supporter. In this way, the "gathering" triggered in a short distance range may be used in the case of different distances between the projection device and the projection curtain. For example, when the distance between the projection device and the projection curtain is 3 m, the distance threshold may be 2.4 m. However, when the distance between the projection device and the projection curtain is 1 m but the distance threshold is still 2.4 m, then the way of triggering the "gathering" by closing to the projection curtain can not be achieved. However, if the distance threshold is reduced to 0.8 m with the reduction of the distance between the projection device and the display supporter, the "gathering" triggered in the short distance range may be achieved.

Furthermore, the display method according to the embodiment of the disclosure may also be applied to an electronic device which includes a display unit and an image acquisition unit. The electronic device includes a touch screen, such as a smart TV. The user may trigger an operation object displayed on the touch screen by a gesture on the touch screen. The electronic device according to the embodiment differs from that with the projection device in that the display unit and the image acquisition unit of the electronic device are located on the same side of the user. Therefore, it is considered that a first preset condition is satisfied in the case that the distance from the user to the electronic device is smaller than a preset distance threshold, or the user faces toward the electronic device, or the distance from the user to the electronic device is smaller than a preset distance threshold and the user faces toward the electronic device.

In this case, the distance threshold may be preset, or the distance threshold may be set according to a distance between the user and the electronic device.

In this case, the electronic device may receive an operation gesture of the user to each operation object by a touch sensing unit, and display an image corresponding to the operation object according to the operation gesture.

Figure 8:
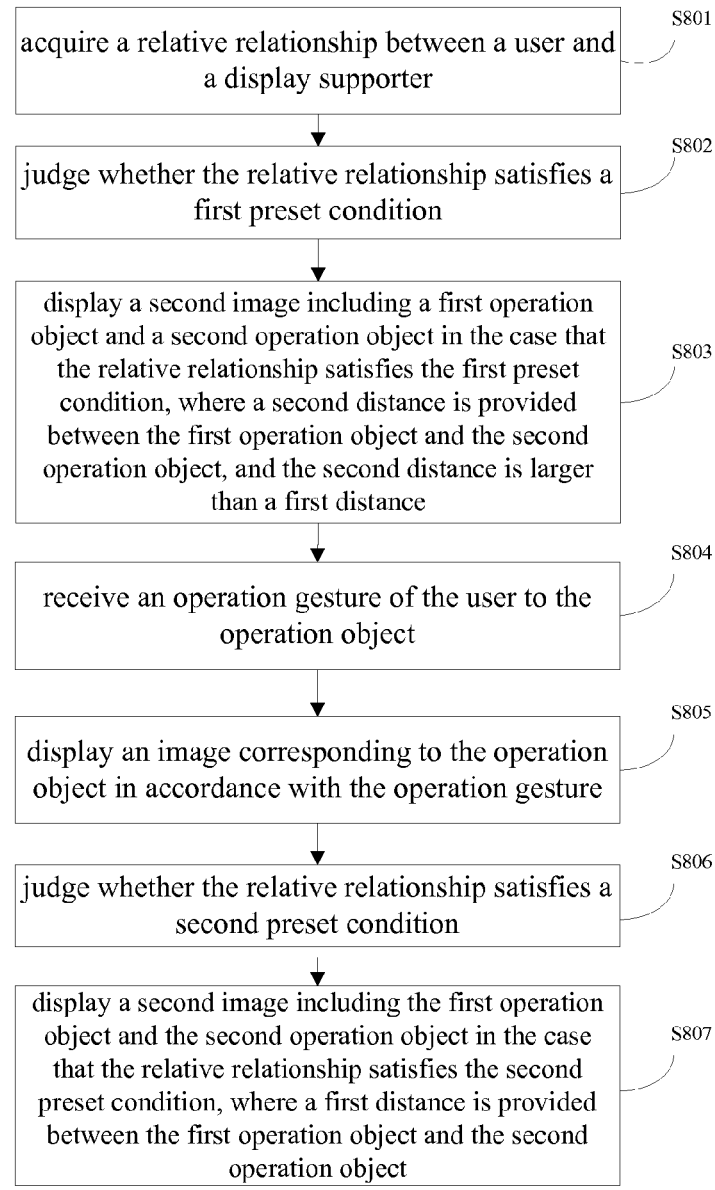
FIG. 8 is a flow chart of another display method according to an embodiment of the disclosure.

Another display method according to an embodiment of the disclosure is applied to an electronic device. The electronic device may present a first image on a display supporter. The first image includes at least a first operation object and a second operation object. A first distance is provided between a first initial display position of the first operation object and a second initial display position of the second operation object. The operation object is triggered to display an image corresponding to the operation object. As shown in FIG. 8, the display method includes steps S801-S807.

S801: acquiring a relative relationship between a user and the display supporter.

S802: determining whether the relative relationship satisfies a first preset condition.

S803: displaying a second image if the relative relationship satisfies the first preset condition. The second image includes the first operation object and the second operation object. A second distance is provided between a first object display position of the first operation object and a second object display position of the second operation object. The second distance is different from the first distance.

In this embodiment, compared with the first image, the first operation object and the second operation object are "scattered" in the second image, which may be achieved by changing the positions of the operation objects. That is, before the second image is displayed, a first position adjustment parameter is determined, and the second image is determined in accordance with the first position adjustment parameter. The first operation object and the second operation object may be "scattered" by integrally amplifying the first image. That is, before the second image is displayed, it is determined that the second image has a second display area when the first image has a first display area, where the second display area is larger than the first display area.

The process of "scattering" the first operation object and the second operation object is opposite to the process of "gathering" them in the above described embodiments, which is not described here.

After the operation objects are "scattered", the operation objects can be "restored", by the steps S804-S807.

S804: receiving an operation gesture of the user to the operation object.

S805: displaying an image corresponding to the operation object in accordance with the operation gesture.

S806: judging whether the relative relationship satisfies a second preset condition.

S807: outputting a third image if the relative relationship satisfies the second preset condition. The third image includes the first operation object and the second operation object. The first distance is provided between a first updated display position of the first operation object and a second updated display position of the second operation object.

Similar to the above described embodiments, the method according to the embodiment can be applied to an electronic device including a projection unit and an image acquisition unit. When the display supporter is located in a projection region of the projection unit, the projection unit may project the first image onto the display supporter. In the electronic device, the display supporter and the image acquisition unit are located on different sides of the user. In addition, the method according to the embodiment may also be applied to an electronic device including a display unit and an image acquisition unit. In this case, the display supporter and the image acquisition unit are located on the same side of the user. Therefore, when the method according to the embodiment is applied to different electronic devices, the processes of acquiring the relative relationship between the user and the display supporter and the methods of determining the first preset condition and the second preset condition are different, as described in the embodiments above.

With the display method according to this embodiment, when the second image is displayed, the operation objects in the second image are "scattered". Therefore, the misoperation problem due to the concentration of the operation objects can be avoided.

Figure 9:
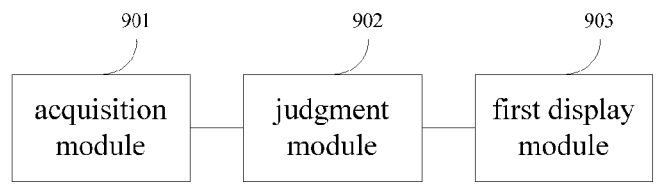
FIG. 9 is a schematic structural diagram of a display apparatus according to an embodiment of the disclosure.

Corresponding to the method according to the embodiments described above, the embodiments of the disclosure also disclose a display apparatus applied to an electronic device. The electronic device may present a first image on a display supporter, and the first image includes at least a first operation object and a second operation object. A first distance is provided between a first initial display position of the first operation object and a second initial display position of the second operation object. The operation object is triggered to display an image corresponding to the operation object. As shown in FIG. 9, the display apparatus includes: an acquisition module 901, a judgment module 902 and a first display module 903.

The acquisition module 901 is configured to acquire a relative relationship between a user and the display supporter.

The judgment module 902 is configured to judge whether the relative relationship satisfies a first preset condition.

The first display module 903 is configured to display a second image if the relative relationship satisfies the first preset condition, where the second image includes the first operation object and the second operation object, a second distance is provided between a first object display position of the first operation object and a second object display position of the second operation object, and the second distance is different from the first distance.

Figure 10:
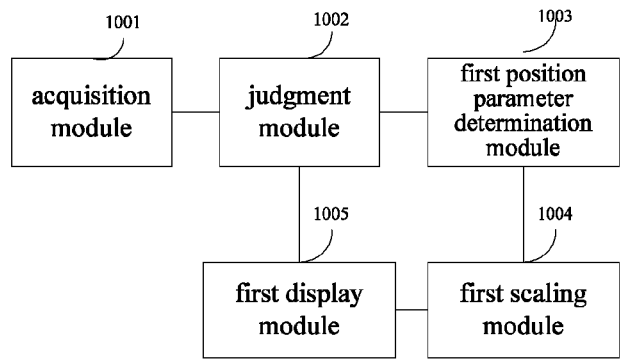
FIG. 10 is a schematic structural diagram of another display apparatus according to an embodiment of the disclosure.

As shown in FIG. 10, another display apparatus according to an embodiment of the disclosure includes: an acquisition module 1001, a judgment module 1002, a first position parameter determination module 1003, a first scaling module 1004, and a first display module 1005.

The acquisition module 1001 is configured to acquire a relative relationship between a user and the display supporter.

The judgment module 1002 is configured to judge whether the relative relationship satisfies the first preset condition.

The first position parameter determination module 1003 is configured to determine a first position adjustment parameter before the second image is displayed, and determine the second image in accordance with the first image and the first position adjustment parameter.

The first position adjustment parameter includes:
a first object position adjustment parameter of the first operation object and/or a second object position adjustment parameter of the second operation object.

The first scaling module 1004 is configured to when the first operation object has a first display area in the first image, determine that the first operation object has a third display area in the second image, where the third display area is different from the first display area; and when the second operation object has a second display area in the first image, determine that the second operation object has a fourth display area in the second image, where the fourth display area is different from the second display area.

The first display area has a first relationship with the third display area, and the second display area has a second relationship with the fourth display area. The first relationship is the same as the second relationship.

The first display module 1005 is configured to display a second image if the relative relationship satisfies the first preset condition, where the second image includes the first operation object and the second operation object, a second distance is provided between a first object display position of the first operation object and a second object display position of the second operation object, and the second distance is different from the first distance.

The first position parameter determination module and the first scaling module may be replaced by a second scaling module.

The second scaling module is configured to, before the second image is displayed, determine that the second image has a second display area when the first image has a first display area, where the second display area is different from the first display area.

Figure 11:
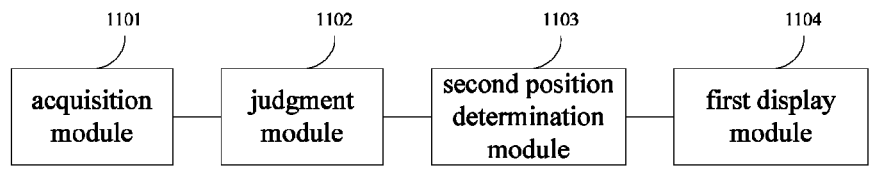
FIG. 11 is a schematic structural diagram of another display apparatus according to an embodiment of the disclosure.

As shown in FIG. 11, the embodiment of the disclosure discloses another display apparatus, which includes an acquisition module 1101, a judgment module 1102, a second position determination module 1103 and a first display module 1104.

The acquisition module 1101 is configured to acquire a relative relationship between a user and the display supporter.

The judgment module 1102 is configured to judge whether the relative relationship satisfies a first preset condition.

The second position determination module 1103 is configured to, in the case where the second distance is smaller than the first distance, determine an operating range of the user on the display supporter before the second image is displayed; determine a second position adjustment parameter in accordance with the operating range; determine the second image in accordance with the second position adjustment parameter, where the first operation object and the second operation object are in the operating range when the second image is displayed according to the second position adjustment parameter.

The first display module 1104 is configured to display a second image if the relative relationship satisfies the first preset condition, where the second image includes the first operation object and the second operation object, a second distance is provided between a first object display position of the first operation object and a second object display position of the second operation object, and the second distance is smaller than the first distance.

Figure 12:
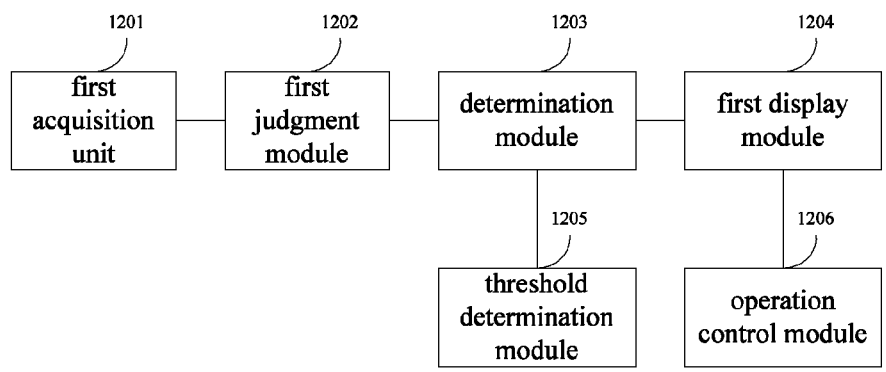
FIG. 12 is a schematic structural diagram of another display apparatus according to an embodiment of the disclosure.

Another embodiment of the disclosure discloses another display apparatus applied to an electronic device including a projection unit and an image acquisition unit. When the display supporter is located in the projection region of the projection unit, the projection unit may project a first image on the display supporter. As shown in FIG. 12, the display apparatus includes: a first acquisition unit 1201, a first judgment unit 1202, a determination module 1203, and a first display module 1204.

The first acquisition unit 1201 is configured to acquire an image captured by the image acquisition unit, where the user is presented in the image.

The first judgment unit 1202 is configured to judge a relative relationship between the user and the display supporter in accordance with the image.

The determination module 1203 is configured to determine whether the relative relationship satisfies a first preset condition.

The first display module 1204 is configured to display a second image if the relative relationship satisfies the first preset condition. The second image includes the first operation object and the second operation object. A second distance is provided between a first object display position of the first operation object and a second object display position of the second operation object. The second distance is different from the first distance.

The first preset condition include at least one of:
a first relationship between a distance from the user to the electronic device and a preset distance threshold;
a second relationship between an orientation of the user and a preset orientation.

Preferably, the apparatus further includes: a threshold determination module 1205, and an operation control module 1206.

The threshold determination module 1205 is configured to detect a distance between the electronic device and the display supporter, and determine the distance threshold in accordance with the distance between the electronic device and the display supporter.

The operation control module 1206 is configured to receive an operation gesture of the user to an operation object, and display an image corresponding to the operation object in accordance with the operation gesture.

In addition to the electronic device described above, the display apparatus according to the embodiment of the disclosure may also be applied to an electronic device including a display unit and an image acquisition unit. The electronic device with the display unit differs from that with the projection unit in that the image acquisition unit and the display unit are located at same side of the user. In this case, the acquisition module includes: a second acquisition unit and a second determination unit.

The second acquisition unit is configured to acquire an image captured by the image acquisition unit, where the user is presented in the image.

The second determination unit is configured to determine the relative relationship between the user and the display supporter in accordance with the image.

In this case, other modules are the same as those in the case that the projection module is provided.

Figure 13:
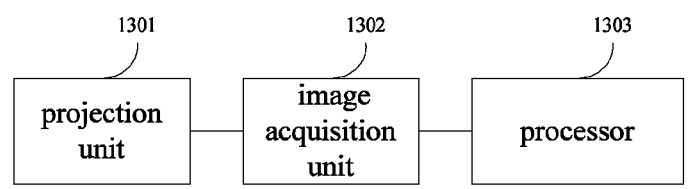
FIG. 13 is a schematic structural diagram of an electronic device according to an embodiment of the disclosure.

As shown in FIG. 13, the disclosure also discloses an electronic device, which includes a projection unit 1301, an image acquisition unit 1302, and a processor 1303.

When the display supporter is located in a projection region of the projection unit, the projection unit may project a first image onto the display supporter. The first image includes at least a first operation object and a second operation object. A first distance is provided between a first initial display position of the first operation object and a second initial display position of the second operation object. The operation object is triggered to display an image corresponding to the operation object;

The processor 1303 is configured to acquire a relative relationship between a user and the display supporter, and judge whether the relative relationship satisfies a first preset condition; display a second image if the relative relationship satisfies the first preset condition. The second image includes the first operation object and the second operation object. A second distance is provided between a first object display position of the first operation object and a second object display position of the second operation object. The second distance is different from the first distance.

The functions implemented by the methods according to the embodiments, if implemented in a software function unit form and be sold or used independently, may be stored in a readable storage medium of a computing device. With such understanding, a portion of the technical contribution to the prior art made by the embodiments of the disclosure or a portion of this technical solution may be embodied in the form of a software product. This software product is stored in one storage medium and includes several instructions for allowing a computing device (may be a personal computer, a server, a mobile computing device or a network device) to perform all or part of the steps of the methods according to the various embodiments of the disclosure. The aforementioned storage medium includes various mediums that may store program codes, such as flash disk, portable hard disk, ROM (Read-Only Memory), RAM (Random Access Memory), magnetic disk or optical disk.

The various embodiments in this disclosure are described progressively. Each embodiment focus on the differences from the other embodiments, and the same and similar parts between various embodiments may be referenced.

Those of skilled in the art may implement and use the disclosure according to the above descriptions of the disclosed embodiments. It will be apparent to those of skilled in the art that various modifications can be made to these embodiments, and the general principle defined herein can be implemented in the other embodiments without departing from the spirit and scope of the disclosure. Therefore, the disclosure will not be limited to those embodiments shown herein, but conform to the widest scope consistent with the principle and novel features disclosed herein.

The invention claimed is:

1. A display method applied to an electronic device including a processor, wherein the electronic device presents a first image on a display supporter, the first image comprises at least a first operation object and a second operation object, a first distance is provided between a first initial display position of the first operation object and a second initial display position of the second operation object, the operation object is triggered to display an image corresponding to the operation object, and the display method comprises:
 acquiring, by the processor, a relative relationship between a user and the display supporter;
 judging, by the processor, whether the relative relationship satisfies a first preset condition; and
 displaying, by the processor, a second image in the case that the relative relationship satisfies the first preset condition, wherein the second image comprises the first operation object and the second operation object, a second distance is provided between a first object display position of the first operation object and a second object display position of the second operation object, and the second distance is different from the first distance.

2. The display method according to claim 1, wherein before the displaying, by the processor, a second image, the display method further comprises:
 determining, by the processor, a first position adjustment parameter; and
 determining, by the processor, a second image in accordance with the first image and the first position adjustment parameter;
 wherein the first position adjustment parameter comprises:
  a first object position adjustment parameter of the first operation object and/or a second object position adjustment parameter of the second operation object.

3. The display method according to claim 2, further comprising:
 in the case that the first operation object has a first display area in the first image, determining, by the processor, that the first operation object has a third display area in the second image, wherein the third display area is different from the first display area; and
 in the case that the second operation object has a second display area in the first image, determining, by the processor, that the second operation object has a fourth display area in the second image, wherein the fourth display area is different from the second display area;
 wherein the first display area has a first relationship with the third display area, the second display area has a second relationship with the fourth display area, and the first relationship is the same as the second relationship.

4. The display method according to claim 1, wherein before the displaying, by the processor, a second image, the display method further comprises: in the case that the first image has a first display area, determining, by the processor, that the second image has a second display area, wherein the second display area is different from the first display area.

5. The display method according to claim 1, wherein in the case where the second distance is smaller than the first distance, before the displaying, by the processor, a second image, the display method further comprises:
 determining, by the processor, an operating range of the user on the display supporter;
 determining, by the processor, a second position adjustment parameter in accordance with the operating range; and
 determining, by the processor, the second image in accordance with the second position adjustment parameter, wherein the first operation object and the second operation object are located in the operating range in the case that the second image is displayed according to the second position adjustment parameter.

6. The display method according to claim 1, wherein the electronic device comprises a projection unit and an image acquisition unit, and wherein in the case that the display supporter is located in a projection region of the projection unit, the projection unit projects the first image on the display supporter, and wherein the acquiring, by the processor, a relative relationship between a user and the display supporter comprises:
 acquiring, by the processor, an image captured by the image acquisition unit, wherein the user is presented in the image; and
 determining, by the processor, the relative relationship between the user and the display supporter in accordance with the image.

7. The display method according to claim 1, wherein the electronic device comprises a display unit and an image acquisition unit, and wherein the acquiring, by the processor, a relative relationship between a user and the display supporter comprises:
 acquiring, by the processor, an image captured by the image acquisition unit, wherein the user is presented in the image; and
 determining, by the processor, the relative relationship between the user and the display supporter in accordance with the image.

8. The display method according to claim 1, wherein the first preset condition comprises at least one of:
 a first relationship between a distance from the user to the electronic device and a preset distance threshold; and
 a second relationship between an orientation of the user and a preset orientation.

9. The display method according to claim 8, wherein the electronic device comprises a projection unit and an image acquisition unit, and wherein in the case that the display supporter is located in a projection region of the projection unit, the projection unit projects the first image on the display supporter, and the method for determining the distance threshold comprises:
 detecting, by the processor, a distance between the electronic device and the display supporter; and
 determining, by the processor, the distance threshold in accordance with the distance between the electronic device and the display supporter.

10. The display method according to claim 1, wherein after the displaying, by the processor, a second image, the display method further comprises:

judging, by the processor, whether the relative relationship satisfies a second preset condition; and outputting, by the processor, a third image in the case that the relative relationship satisfies the second preset condition, wherein the third image comprises the first operation object and the second operation object, the first distance is provided between a first updated display position of the first operation object and a second updated display position of the second operation object.

11. The display method according to claim 1, further comprising:

receiving, by the processor, an operation gesture of the user to the operation object; and displaying, by the processor, an image corresponding to the operation object in accordance with the operation gesture.

12. A display apparatus applied to an electronic device, wherein the electronic device presents a first image on a display supporter, the first image comprises at least a first operation object and a second operation object, a first distance is provided between a first initial display position of the first operation object and a second initial display position of the second operation object, the operation object is triggered to display an image corresponding to the operation object, and wherein the display apparatus comprises a processor, the processor configured to acquire a relative relationship between a user and the display supporter, judge whether the relative relationship satisfies a first preset condition, and display a second image if the relative relationship satisfies the first preset condition, wherein the second image comprises the first operation object and the second operation object, a second distance is provided between a first object display position of the first operation object and a second object display position of the second operation object, and the second distance is different from the first distance.

13. The display apparatus according to claim 12, wherein the processor is further configured to determine a first position adjustment parameter before the second image is displayed, and determine the second image in accordance with the first image and the first position adjustment parameter;

wherein the first position adjustment parameter comprises: a first object position adjustment parameter of the first operation object and/or a second object position adjustment parameter of the second operation object.

14. The display apparatus according to claim 13, wherein the processor is further configured to:

in the case that the first operation object has a first display area in the first image, determine that the first operation object has a third display area in the second image, wherein the third display area is different from the first display area; and in the case that the second operation object has a second display area in the first image, determine that the second operation object has a fourth display area in the second image, wherein the fourth display area is different from the second display area;

wherein the first display area had a first relationship with the third display area, the second display area had a second relationship with the fourth display area, and the first relationship is the same as the second relationship.

15. The display apparatus according to claim 12, wherein the processor is further configured to, before the second image is displayed, determine that the second image has a second display area in the case that the first image has a first display area, wherein the second display area is different from the first display area.

16. The display apparatus according to claim 12, wherein the processor is further configured to, in the case where the second distance is smaller than the first distance, determine an operating range of the user on the display supporter before the second image is displayed, determine a second position adjustment parameter in accordance with the operating range; and determine the second image in accordance with the second position adjustment parameter, wherein the first operation object and the second operation object are located in the operating range in the case that the second image is displayed according to the second position adjustment parameter.

17. The display apparatus according to claim 12, wherein the electronic device comprises a projection unit and an image acquisition unit, and in the case that the display supporter is located in a projection region of the projection unit, the projection unit projects the first image on the display supporter, and wherein the processor is further configured to:

acquire an image captured by the image acquisition unit, wherein the user is presented in the image; and determine the relative relationship between the user and the display supporter in accordance with the image.

18. The display apparatus according to claim 12, wherein the electronic device comprises a display unit and an image acquisition unit, and the processor is further configured to:

acquire an image captured by the image acquisition unit, wherein the user is presented in the image; and determine the relative relationship between the user and the display unit in accordance with the image.

19. The display apparatus according to claim 12, wherein the processor is further configured to, after the second image is displayed, judge whether the relative relationship satisfies a second preset condition, and output a third image in the case that the relative relationship satisfies the second preset condition, wherein the third image comprises the first operation object and the second operation object, and the first distance is provided between a first updated display position of the first operation object and a second updated display position of the second operation object.

20. An electronic device, comprising:

a projection unit and an image acquisition unit, wherein in the case that a display supporter is located in a projection region of the projection unit, the projection unit projects a first image on the display supporter, the first image comprises at least a first operation object and a second operation object, a first distance is provided between a first initial display position of the first operation object and a second initial display position of the second operation object, and the operation object is triggered to display an image corresponding to the operation object; and a processor configured to acquire a relative relationship between a user and the display supporter, and judge whether the relative relationship satisfies a first preset condition; display a second image in the case that the relative relationship satisfies the first preset condition, wherein the second image comprise the first operation object and the second operation object, a second distance is provided between a first object display position of the first operation object and a second object display position of the second operation object, and the second distance is different from the first distance.

* * * * *